United States Patent
Lansonneur

(10) Patent No.: US 12,491,376 B2
(45) Date of Patent: Dec. 9, 2025

(54) SPOT POSITIONING BASED ON MINIMUM MONITOR UNIT (MU) CONSTRAINT AND OPTIMIZATION OBJECTIVES FOR A RADIATION THERAPY SYSTEM

(71) Applicant: Varian Medical Systems International AG, Cham (CH)

(72) Inventor: Pierre Lansonneur, Lyons (FR)

(73) Assignee: SIEMENS HEALTHINEERS INTERNATIONAL AG, Steinhausen (CH)

( * ) Notice: Subject to any disclaimer, the term of this patent is extended or adjusted under 35 U.S.C. 154(b) by 779 days.

(21) Appl. No.: 17/842,711

(22) Filed: Jun. 16, 2022

(65) Prior Publication Data

US 2023/0405358 A1    Dec. 21, 2023

(51) Int. Cl.
*A61N 5/10* (2006.01)

(52) U.S. Cl.
CPC ......... *A61N 5/1031* (2013.01); *A61N 5/1071* (2013.01)

(58) Field of Classification Search
CPC ................ A61N 5/1031; A61N 5/1071; A61N 2005/1087; A61N 5/1043; A61N 5/103
See application file for complete search history.

(56) References Cited

U.S. PATENT DOCUMENTS

| | | | | |
|---|---|---|---|---|
| 8,395,131 B2 * | 3/2013 | Wu | ....... | A61N 5/1031 372/64 |
| 9,192,782 B1 * | 11/2015 | Grimm | ....... | A61N 5/1031 |
| 11,559,702 B2 * | 1/2023 | Labarbe | ....... | A61N 5/1031 |
| 2004/0165696 A1 * | 8/2004 | Lee | ....... | G16H 20/40 378/65 |
| 2007/0040127 A1 * | 2/2007 | Brahme | ....... | G21K 1/046 250/389 |

(Continued)

FOREIGN PATENT DOCUMENTS

EP    4252840    10/2023

OTHER PUBLICATIONS

Ur Rehman, M et al., "An optimized approach for robust spot placement in proton pencil beam scanning," Physics in Medicine & Biology, vol. 64, 2019.

(Continued)

*Primary Examiner* — Bo Joseph Peng
(74) *Attorney, Agent, or Firm* — Harness, Dickey & Pierce, P.L.C.

(57) ABSTRACT

A computer implemented method of determining spot positioning for each field associated with a planning target volume (TV) is disclosed. The method includes accessing said dose volume constraints and information associated with a TV structure and associated organs at risk (OAR) structure. The method further includes determining a density map for each structure. Also, the method includes using a minimum number of Monitor Units (MU) per spot constraint, computing a minimum distance between spots for a portion of a field that overlaps with the TV structure and a portion of the field that overlaps with the OAR structure. The method further includes applying a rendering process to convert the density map for each of the portions into a set of points. Using the set of points and the minimum distance between spots computed, the method includes determining a spot map for each of the portions.

20 Claims, 9 Drawing Sheets

(56) References Cited

U.S. PATENT DOCUMENTS

| | | | |
|---|---|---|---|
| 2010/0104068 A1* | 4/2010 | Kilby | A61N 5/1031 |
| | | | 378/65 |
| 2020/0129781 A1 | 4/2020 | Engwall et al. | |
| 2020/0306559 A1* | 10/2020 | Kuusela | A61N 5/1043 |
| 2021/0379405 A1 | 12/2021 | Huth et al. | |
| 2022/0118282 A1 | 4/2022 | Soukup et al. | |

OTHER PUBLICATIONS

Secord, Adrian, "Weighted Voronoi Stippling," NPAR, 2002.

* cited by examiner

SPOT POSITIONING BASED ON MINIMUM MONITOR UNIT (MU) CONSTRAINT AND OPTIMIZATION OBJECTIVES FOR A RADIATION THERAPY SYSTEM

TECHNICAL FIELD

This description relates generally to the field of radiation therapy, and more particularly to optimizing performance of the therapy system in the execution of a radiation therapy treatment plan with a minimum spot weight constraint while maintaining acceptable plan quality.

BACKGROUND

Radiation therapy treatment plan development generally employs medical imaging, such as X-ray, computed tomography (CT), magnetic resonance imaging (MRI), or the like. Typically, a series of two-dimensional patient images, each representing a two-dimensional cross-sectional "slice" of the patient anatomy, are used to reconstruct a three-dimensional representation of a volume of interest (VOI), or structure of interest, from the patient anatomy.

The VOI typically includes one or more organs of interest, often including a planning target volume (PTV), such as a malignant growth or an organ including malignant tissue targeted for radiation therapy; a relatively healthy organ at risk (OAR) in the vicinity of a malignant growth at risk of radiation therapy exposure; or a larger portion of the patient anatomy that includes a combination of one or more PTVs along with one or more OARs. The objective of the radiation therapy treatment plan development typically aims to irradiate as much of the PTV as near the prescription dose as possible, while attempting to minimize irradiation of nearby OARs.

The resulting radiation therapy treatment plans are used during medical procedures to selectively expose precise areas of the body, such as malignant tumors, to specific doses of radiation in order to destroy the undesirable tissues. During the development of a patient-specific radiation therapy treatment plan, information generally is extracted from the three-dimensional model to determine parameters such as the shape, volume, location, and orientation of one or more PTVs along with one or more OARs.

Proton therapy is a type of external beam radiation therapy that is characterized by the use of a beam of protons to irradiate diseased tissue. Typically, radiation therapy involves directing a beam of high energy proton, photon, or electron radiation ("therapeutic radiation") into a target volume (e.g., a tumor or lesion). A chief advantage of proton therapy over other conventional therapies such as X-ray or neutron radiation therapies is that proton radiation can be limited by depth, and therefore the exposure to inadvertent radiation can be avoided or at least limited by non-target cells having a depth beyond a target calculated area.

A popular implementation of proton therapy uses mono-energetic pencil beams at varying energy levels, which are spot-scanned over a target area for one or more layers of depth. By superposition of several proton beams of different energies, a Bragg peak can be spread out to cover target volumes using a uniform, prescribed dose. This enables proton radiation applications to more precisely localize the radiation dosage relative to other types of external beam radiotherapy. During proton therapy treatment, a particle accelerator such as a cyclotron or synchrotron is used to generate a beam of protons from, for example, an internal ion source located in the center of the particle accelerator. The protons in the beam are accelerated (via a generated electric field), and the beam of accelerated protons is subsequently "extracted" and magnetically directed through a series of interconnecting tubes (called a beamline), often through multiple chambers, rooms, or even floors of a building, before finally being applied through a radiation application device at an end section of beam line (often through a radiation nozzle) to a target volume in a treatment room.

As the volumes (e.g., organs, or regions of a body) targeted for radiation therapy are often below the surface of the skin and/or extend in three dimensions, and since proton therapy—like all radiation therapies—can be harmful to intervening tissue located in a subject between the target area and the beam emitter, the precise calculation and application of correct dosage amounts and positions are critical to avoid exposing regions in the radiation subject outside the specific areas targeted to receive radiation.

Before a patient is treated with radiation, a treatment plan specific for that patient is developed. The treatment plan defines various aspects of the therapy using simulations and optimizations based on past experiences. For example, for intensity modulated radiation therapy (IMRT), the treatment plan can specify the appropriate beam type and the appropriate beam energy. Other parts of the treatment plan can specify, for example, the angle of the beam relative to the patient, the beam shape, the placement of boluses and shields, and the like. In general, the purpose of the treatment plan is to deliver sufficient radiation to the target volume while minimizing exposure of surrounding healthy tissue to the radiation (e.g., the OARs).

In IMRT, the goal of the planner is to find a solution that is optimal with respect to multiple clinical goals that may be contradictory in the sense that an improvement toward one goal may have a detrimental effect on reaching another goal. For example, a treatment plan that spares the liver from receiving a dose of radiation may result in the stomach receiving too much radiation. These types of tradeoffs lead to an iterative process in which the planner creates different plans to find the one plan that is best suited to achieving the desired outcome. Furthermore, treatment planning software can be used to find an optimal plan that considers all the clinical goals and dosimetric criteria.

In spot or pencil-beam scanning, a beam is directed to spots in a treatment target as prescribed by the treatment plan. The prescribed spot locations are typically arranged in a fixed (raster) pattern for each energy layer of the beam, and the beam is delivered on a fixed scanning path within an energy layer. By superposition of several beams of different energies at neighboring spots, the Bragg peaks of the beams overlap to deliver the prescribed dose across the treatment target up to the edges of the target, with a sharp drop to zero dose beyond the edges.

A precise calculation of the number of spots and their placement (location and distribution) are critical. The goal is to determine a spot placement that: conforms to the outline of the treatment target, improves the lateral penumbra and spares healthy tissue outside the treatment target from exposure to radiation beyond what is necessary to treat the unhealthy tissue; and is uniform inside the treatment target, to avoid dose variations (dose inhomogeneity) inside the treatment target so that the prescribed dose is delivered to all parts of the target.

When generating a treatment plan associated with intensity modulation proton therapy (IMPT), an initial set of spot positions or grid is specified for the entire treatment target, and the plan is optimized by adjusting the weights (number of protons or Monitor Unit (MU)) of the spots in the pattern. Typically, the number of spots in the initial set of spot positions is maintained as low as possible to reduce the time it takes to optimize the plan and to achieve a high-quality plan with respect to dosimetry. Also, if the initial set of spot positions includes a large number of spots, then the final treatment plan may also include many spots, thus lengthening the treatment time (dose delivery time) to the detriment of the patient.

FIG. 1 illustrates an exemplary set of spot positions computed by an optimizer tool for a conventional IMPT system. As shown in FIG. 1, the set of spot positions for the field comprises multiple spots 110. In conventional IMPT systems, typically only the spot weights are optimized to fulfill dosimetric criteria and the spots are located on a regular lattice as shown in FIG. 1. The weights may, for example, be optimized to fulfill dosimetric constraints based on dose volume histograms (DVH). One of the challenges that may be encountered in such conventional systems is that they do not provide users a mechanism to constrain the spot weights to be above a particular threshold when optimizing spot weights. The users may want the optimized spot weights to be over a particular threshold value for a number of reasons including overcoming machine hardware constraints, increasing the dose rate, reducing the number of spots in the plan and reducing delivery times. Constraining the spot weight to be above a particular minimum or threshold value may, however, be problematic because it can lead to a competing interest between preserving both an acceptable plan quality and maintaining a minimum spot weight. Accordingly, conventional IMPT systems simply ignore both minimum weight (proton or MU) constraints and dose optimization constraints when positioning spots in a set of spot positions, as shown in FIG. 1. Alternatively, conventional IMPT systems compute sub-optimal solutions when the range of spot weights is limited.

SUMMARY

Embodiments according to the present invention provide a methodology and system that allow the minimum weight or MU per field to be taken into account when predicting the density of spots in an initial set of spot positions associated with the treatment target. The information regarding the density of spots in the set of spot positions based on the minimum weight criteria is combined with certain optimization objectives (e.g., number of MUs to be delivered to organs at risk (OARs)) to derive a set of spot positions that fulfill both the minimum weight or MU constraint and the optimization objectives.

In one embodiment, a computer implemented method of determining spot positioning for each field associated with a planning target volume (PTV) (or a clinical target volume (CTV)) is disclosed. The method comprises accessing the dose volume constraints and information associated with a planning target volume (PTV) field and associated organs at risk (OAR) field. The method further comprises determining a density map for each of the PTV field and the OAR field. Also, the method comprises using a minimum number of Monitor Units (MU) per spot constraint, computing a minimum distance between spots for each of the PTV field and the OAR field. The method further comprises applying a rendering process to convert the density map for each of the PTV field and the OAR field into a set of points. Using the set of points and the minimum distance between spots computed, the method comprises determining a spot map for each of the PTV field and the OAR field.

Thus, embodiments according to the invention improve the field of radiation treatment planning specifically and the field of radiation therapy in general. By allowing both the minimum weight and the optimization objectives (e.g., with respect to OARs) to be combined, embodiments of the present invention allow treatment plans to be created that overcome certain machine hardware constraints and advantageously provide for increased dose rates, a reduced number of spots in the plan, and reduced delivery times for the plans.

Embodiments according to the present invention provide improved methods that can be used for generating radiation treatment plans for radiation therapy (RT) including FLASH RT. For FLASH RT, dose rates of at least 40 grays (Gy) in less than one second, and as much as 120 Gy per second or more, may be used.

These and other objects and advantages of embodiments according to the present invention will be recognized by one skilled in the art after having read the following detailed description, which are illustrated in the various drawing figures.

This summary is provided to introduce a selection of concepts that are further described below in the detailed description that follows. This summary is not intended to identify key features or essential features of the claimed subject matter, nor is it intended to be used to limit the scope of the claimed subject matter.

DETAILED DESCRIPTION

Figure 1:
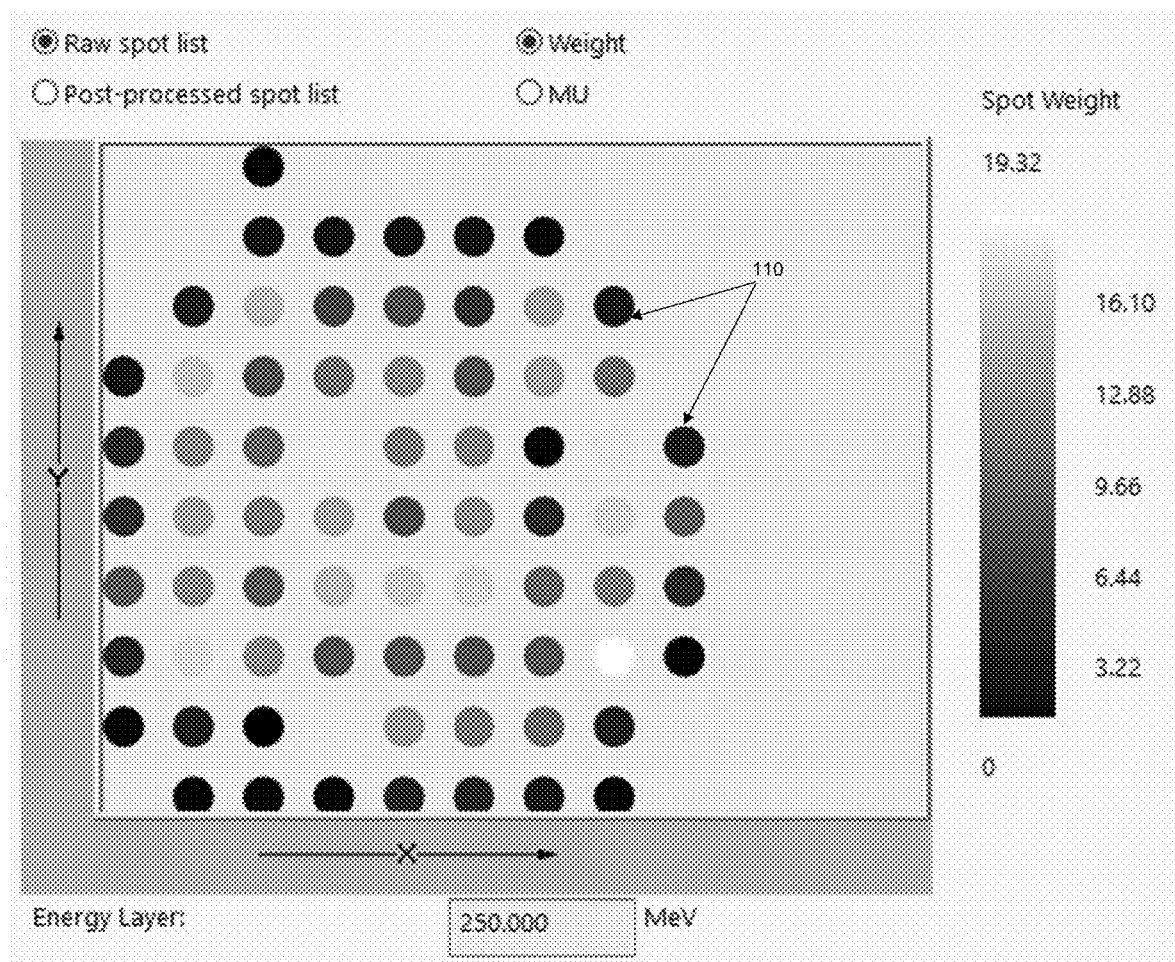
FIG. 1 illustrates an exemplary set of spot positions computed by an optimizer tool for a conventional IMPT system.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "determining," "using," "applying," "computing" or the like, refer to actions and processes (e.g., the flowcharts of FIG. 9) of a computing system or similar electronic computing device or processor (e.g., the computing system 200 of FIG. 2). The computing system or similar electronic computing device manipulates and transforms data represented as physical (electronic) quantities within the computing system memories, registers or other such information storage, transmission or display devices.

Portions of the detailed description that follows are presented and discussed in terms of a method. Although steps and sequencing thereof are disclosed in figures herein (e.g., FIG. 8) describing the operations of this method, such steps and sequencing are exemplary. Embodiments are well suited to performing various other steps or variations of the steps recited in the flowchart of the figure herein, and in a sequence other than that depicted and described herein.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

This present disclosure provides a solution to the challenge inherent in limiting the range of spot weights when determining an optimized treatment plan. As explained above, one of the challenges that may be encountered in conventional IMPT systems is that they do not provide users a way to constrain the spot weights to be above a particular threshold when optimizing spot weights. Constraining the spot weight to be above a particular minimum value in conventional systems proves to be problematic because it can lead to a competing interest between preserving both an acceptable plan quality and maintaining a minimum spot weight. Accordingly, conventional IMPT systems simply ignore the minimum weight (proton or Monitor Unit (MU)) constraints and associated dose optimization constraints (e.g., for planning target volume (PTV), clinical target volume (CTV) and organs at risk (OAR)) when positioning spots for a particular treatment plan. Alternatively, conventional IMPT systems compute sub-optimal solutions when the range of spot weights is limited.

Embodiments according to the present invention provide a methodology that allows the minimum or threshold weight or MU for each spot in a field to be taken into account when predicting the density of spots in an initial set of spot positions associated with the treatment target. The information regarding the density of spots in the set of spot positions based on the minimum weight criteria is combined with certain optimization objectives (e.g., with respect to PTVs, and OARs) to derive a set of spot positions that fulfill both the minimum weight or MU constraint and the optimization objectives.

Thus, embodiments according to the invention improve the field of radiation treatment planning specifically and the field of intensity modulation proton therapy (IMPT) in general. By allowing both the minimum weight and the optimization objectives (e.g., with respect to PTVs, OARs) to be combined, embodiments of the present invention allow treatment plans to be created that can overcome certain machine hardware constraints and provide for increased dose rates. Further the treatment plans may comprise a reduced number of spots in the plan, and also reduce delivery times for the plans.

Figure 2:
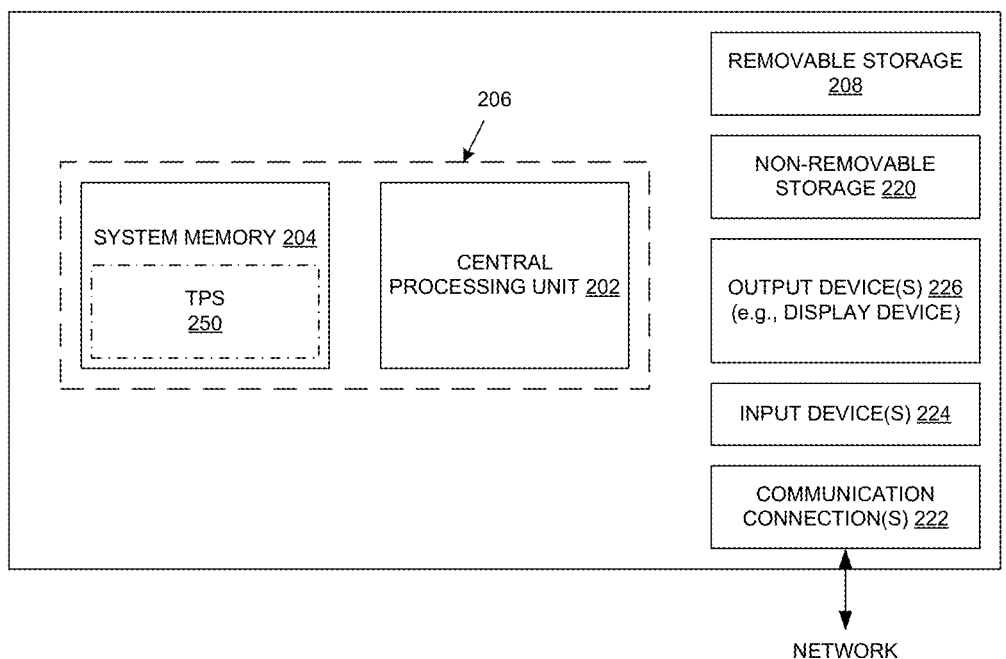
FIG. 2 shows a block diagram of an example of a computer system upon which the embodiments described herein may be implemented.

FIG. 2 shows a block diagram of an example of a computer system 200 upon which the embodiments described herein may be implemented. In its most basic configuration, the system 200 includes at least one processing unit 202 and memory 204. This most basic configuration is illustrated in FIG. 2 by dashed line 206. The system 200 may also have additional features and/or functionality. For example, the system 200 may also include additional storage (removable and/or non-removable) including, but not limited to, magnetic or optical disks or tape. Such additional storage is illustrated in FIG. 2 by removable storage 208 and non-removable storage 220. The system 200 may also contain communications connection(s) 222 that allow the device to communicate with other devices, e.g., in a networked environment using logical connections to one or more remote computers.

The system 200 also includes input device(s) 224 such as a keyboard, mouse, pen, voice input device, touch input device, etc. Output device(s) 226 such as a display device, speakers, printer, etc., are also included. A display device may be, for example, a cathode ray tube display, a light-emitting diode display, or a liquid crystal display.

In the example of FIG. 2, the memory 204 includes computer-readable instructions, data structures, program modules, and the like associated with a treatment planning system (TPS) 250, which may also be referred to as an optimizer. However, the treatment planning system 250 may instead reside in any one of the computer storage media used by the computer system 200, or may be distributed over some combination of the computer storage media, or may be distributed over some combination of networked computers. The treatment planning system 250 is used to evaluate and produce a final (prescribed) treatment plan.

More specifically, a proposed radiation treatment plan is defined (e.g., using the treatment planning system 250 of FIG. 2), stored in a computer system memory, and accessed from that memory. The proposed radiation treatment plan includes values of parameters that can affect dose and dose rate, as well as other parameters. The parameters may also include angles (directions) of beams to be directed toward a treatment target, and a beam energy for each of the beams. The parameters may also include a schedule for applying the irradiations.

During treatment, in an example embodiment, a particle beam enters a nozzle of a radiotherapy machine, which includes one or more components that affect (e.g., decrease, modulate) the energy of the beam, to control the dose delivered by the beam and/or to control the dose versus depth curve of the beam, depending on the type of beam. For example, for a proton beam or an ion beam that has a Bragg peak, the nozzle can control the location of the Bragg peak in the treatment target laterally to the beam axis. In other embodiments, energy modulation is performed outside of the nozzle (e.g., upstream of the nozzle).

In embodiments according to the invention, the nozzle emits particles in a spot scanning beam (also referred to as a pencil beam). The nozzle is mounted on a moveable gantry so that the beam can be delivered from different directions (angles) relative to a patient (treatment target) on the patient support device, and the position of the patient support device relative to the beam may also be changed. The target area is irradiated with a raster scan by the spot scanning beam.

The beam can deliver a relatively high dose rate (a relatively high dose in a relatively short period of time). For example, if necessary, the beam can deliver more than 40 grays (Gy) in less than one second.

Figure 3:
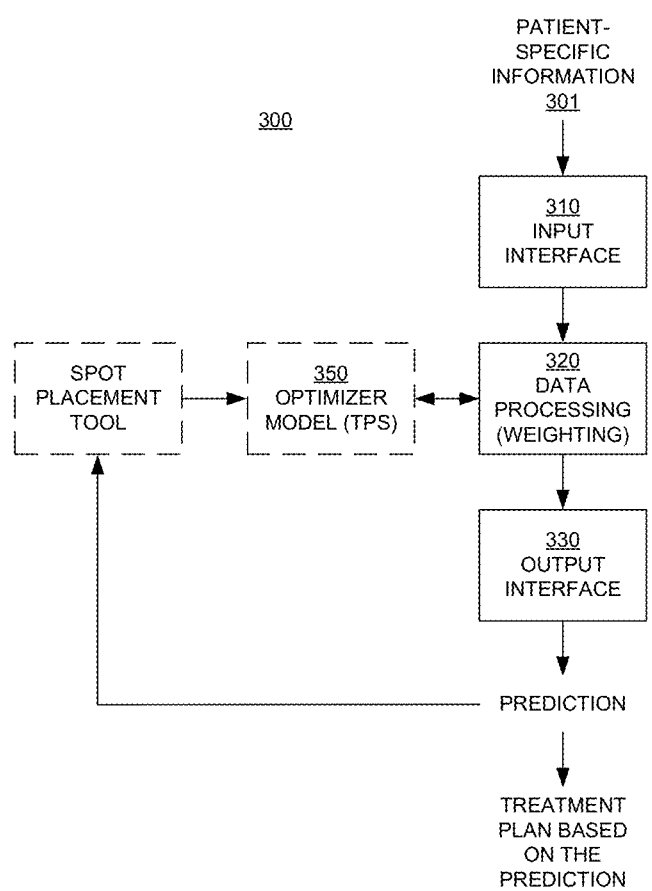
FIG. 3 is a block diagram illustrating an example of an automated radiation therapy treatment planning system in embodiments according to the present invention.

FIG. 3 is a block diagram illustrating an example of an automated radiation therapy treatment planning system 300 in embodiments according to the present invention. The system 300 includes an input interface 310 to receive patient-specific information (data) 301, a data processing component 320 that implements the treatment planning system 250, and an output interface 330. The system 300 in whole or in part may be implemented as a software program, hardware logic, or a combination thereof on/using the computer system 200 (FIG. 2).

In the example of FIG. 3, the patient-specific information 301 is provided to and processed by the treatment planning system 250, which yields a prediction result. A proposed radiation treatment plan based on the prediction result can then be generated.

The inputs to the data processing component 320 (e.g., the treatment planning system 250) include a initial set of spot positions (or grid or placement) of spots in the treatment target. The initial spot positions may itself be generated by a spot placement tool that is coupled to or is a component of the treatment planning system 250 (or 350 in FIG. 3). Alternatively, the initial set of spot positions of spots may be computed by the data processing component 320 or the treatment planning system 350 based on the minimum MUs per spot and the MU per field.

As will be described further below, in embodiments according to the disclosed invention, the initial set of spot positions and associated density of spots for optimization in the treatment planning system 250 is based on a minimum weight or minimum MU constraint. The treatment planning system 250 is then able to predict the spot positions for a particular field (e.g., a PTV, an OAR, etc.) based on the minimum MU constraint and the optimization objectives associated with, for example, the PTV and OARs to derive a set of spot positions that fulfills both the minimum MU constraints and the optimization objectives. The goal is to determine a set of spot positions so that, during treatment, the treatment target will receive a homogenous dose (a uniform dose across the treatment target) and the delivered dose will conform more closely to the edges of the treatment target.

More specifically, the proposed radiation treatment plan is evaluated to determine whether or not the minimum MU constraints and objectives (e.g., clinical goals) that are specified for treatment of a patient are satisfied by the proposed radiation treatment plan. The clinical goals or objectives may be expressed in terms of a set of quality metrics, such as target homogeneity, conformity to the treatment target, critical organ sparing, and the like, with respective target values for the metrics.

If the treatment planning system 250 is unable to converge on a set of spot positions and weights that satisfy those goals, then the initial set of spot positions can be changed and the process just described can be repeated. Several satisfactory treatment plans may be determined, in which case the treatment plan that is judged as best satisfying the minimum MU constraints and specified objectives (clinical goals) can be selected as the prescribed (final) treatment plan.

As mentioned above, embodiments according to the present invention provide a methodology that allows the minimum weight or MU for a spot in a given field to be taken into account when predicting the density of spots associated with the treatment target. Conventional treatment planning systems ignore the minimum MU per spot in a field when positioning spots.

Figure 4:
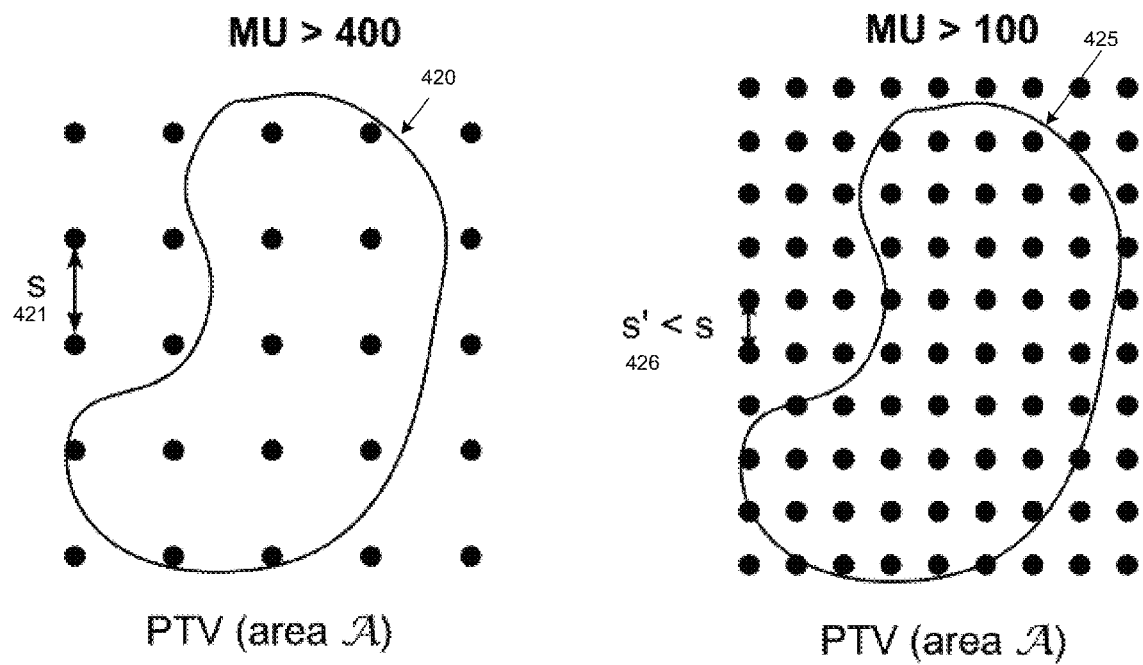
FIG. 4 illustrates the manner in which spot positioning in the initial set of spot positions is computed based on the minimum MU per spot in a field constraint in accordance with an embodiment of the present invention.

FIG. 4 illustrates the manner in which spot positioning in the initial set of spot positions is computed based on the minimum MU per spot in a field constraint in accordance with an embodiment of the present invention.

Equation 1.1 below may be used to determine the total MU per field. The total MU in a field is the sum of the MUs for each individual spot MU.

$$MU_{field} = \sum_{i=0}^{N_{spots}} MU_i \quad (1.1)$$

Since each MU is constrained to be above a threshold minimum value, the total number of spots in the field can be computed using equation 1.2 below.

$$N_{spots} \leq \frac{MU_{field}}{MU_{min}} \quad (1.2)$$

Where each spot covers an area $s^2$, the total covered surface of the PTV A is given by equation 1.3 below.

$$N_{spots} \cdot s^2 = \mathcal{A} \quad (1.3)$$

Finally, the minimum distance s needed between spots in the pattern to satisfy the minimum MU constraint can be established by equation 1.4 below.

$$s_{min} = \sqrt{\frac{\mathcal{A} \cdot MU_{min}}{MU_{field}}} \quad (1.4)$$

Because $s_{min}$ in equation 1.4 above is directly proportional to the minimum MU per spot constraint, the larger the minimum MU per spot, the wider apart the spots will need to be placed when determining the set of spot positions. As shown in FIG. 4, spots are evenly spaced by a distance (s 421 for PTV 420 or s' 426 for PTV 425) on a regular grid to cover the cross section (area $\mathcal{A}$) of the respective PTV as seen from the beam eye view (represented by the solid line contour associated with the respective PTV). The distance is proportional to the MU requested. Accordingly, the spacing s for PTV 420 where the minimum MU per spot is 400 is higher than the spacing s' for PTV 425 where the minimum MU per spot is 100. Note that the term PTV may be used interchangeably with the term clinical target volume (CTV) for purposes of this discussion.

As also mentioned above, the information regarding the density of spots (e.g., the spot spacing) based on the minimum weight criteria is combined with certain optimization objectives, e.g., for PTVs and OARs to derive a set of spot positions that fulfill both the minimum weight or MU constraint and the optimization objectives.

Figure 5:
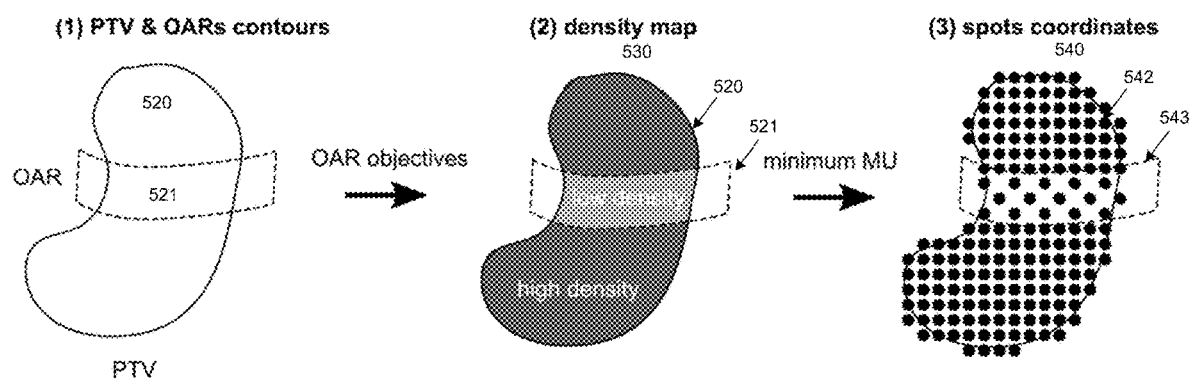
FIG. 5 illustrates the manner in which a desired density map is obtained for each field or region of a PTV, including OARs, in accordance with an embodiment of the present invention.

FIG. 5 illustrates the manner in which a desired density map is obtained for each field or region of a PTV, including OARs, in accordance with an embodiment of the present invention. Clinicians typically formulate a desired dose distribution in terms of dose volume objectives or constraints. The dose volume objectives, for example, may include criteria for reducing the amount of dose received by an OAR. These objectives can, among other things, be used to reduce the density of spots in regions where an OAR is in the field. As shown in FIG. 5, information associated with the PTV contour 520 (as seen from the field view) and OAR contour 521 within the PTV may be inputted into a treatment planning system (e.g., treatment planning system 350 of FIG. 3). The OAR contour 521 and the PTV contour 520 with their respective dose optimization constraints are first converted into a desired density map for each field (e.g., the PTV field and the OAR field associated with the respective contours for each field).

The treatment planning system or optimizer produces a density map 530 for the PTV, which includes respective density maps for the PTV field 520 and the OAR field 521. As seen in FIG. 5, a high density is assigned for the PTV field 520 and a low density is assigned for the OAR field 521 in order to protect the critical organs associated with the OAR field 521. The density map is subsequently used to tune the distance between each spot as shown in the spot coordinate map 540, where the positioning of the spots satisfies the minimum distance imposed by the minimum MU constraint (as discussed in relation to equation 1.4 above). As seen in the spot coordinate map 540, the spots associated with the OAR field 543 are spaced further apart than the positions associated with the PTV field 542.

In one embodiment, the spot coordinates can then be rearranged to achieve better plan quality. Compared to regular grid positioning, as implemented by conventional systems, it has been shown that several dose metrics, e.g., homogeneity, conformality, etc. are further improved when rearranging the spot positions, using for instance a process such as the Lloyd's process. However, when rearranging the spots using the Lloyd's process, the density information is typically not used which results in the computed spot positions maximizing criteria such as PTV homogeneity, but not taking into account the presence of OARs.

In one embodiment, the treatment planning system determines a density map for the PTV and OARs using dose objectives. Then the treatment planning system converts the density map into a set of spot positions using the weighted Voronoi stippling process (a rendering process) and the minimum MU constraints discussed above. In other words, embodiments of the present invention advantageously rearrange spot coordinates for each field using the weighted Voronoi stippling process and the minimum MU constraint.

Figure 6:
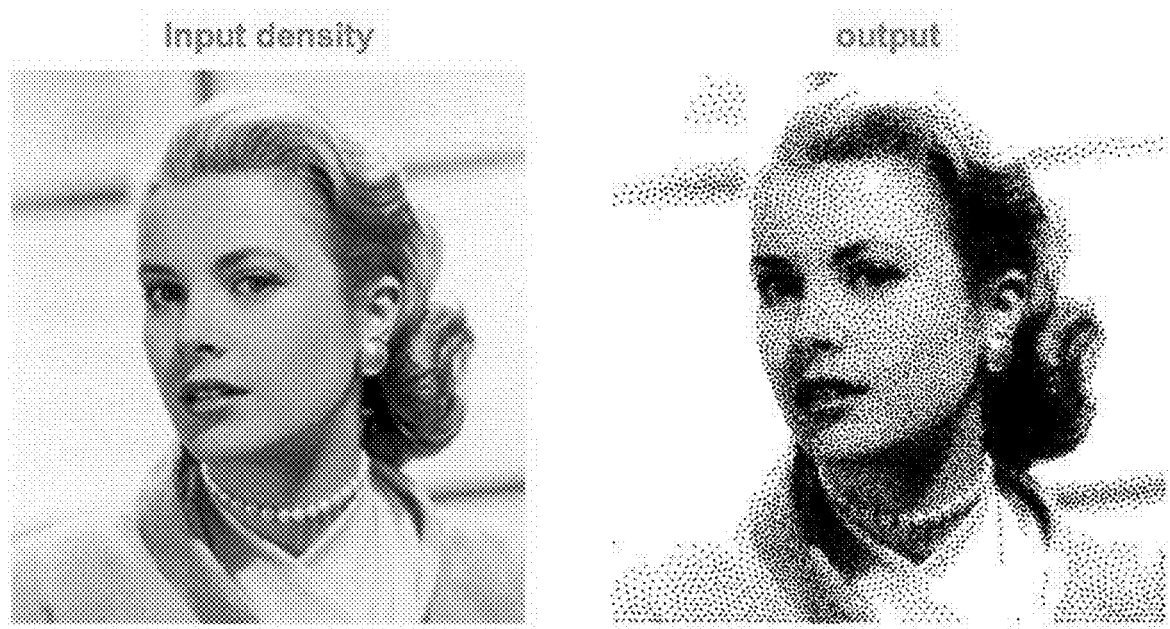
FIG. 6 illustrates a grayscale image that is converted into a set of points using a weighted Voronoi Stippling process.

FIG. 6 illustrates a grayscale image that is converted into a set of points using the weighted Voronoi stippling process. As shown given an image with a certain input density, an output image is produced comprising a set of points, where the density of points is higher in the darker regions of the image.

Figure 7:
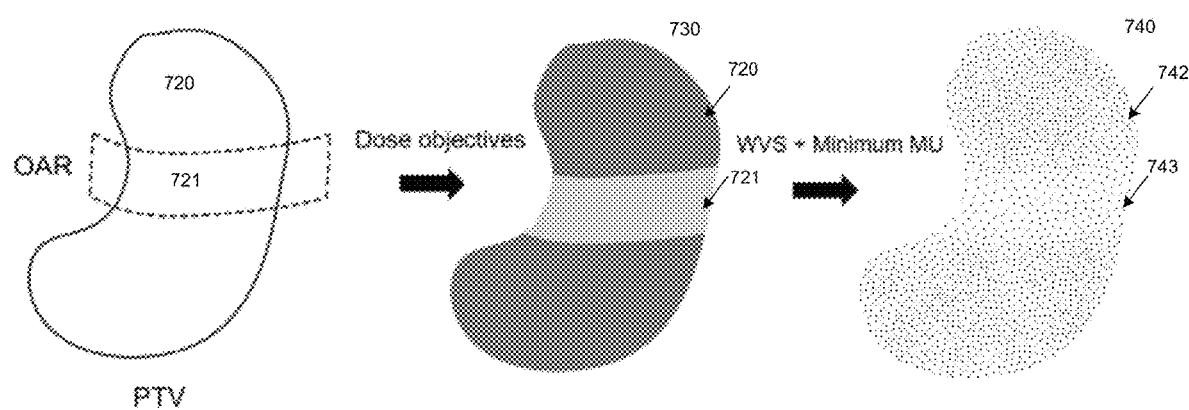
FIG. 7 illustrates the manner in which spot positions for a PTV and associated OAR is determined from a desired density map using the minimum MU constraint and a weighted Voronoi stippling, in accordance with an embodiment of the present invention.

FIG. 7 illustrates the manners in which spot positions for a PTV and associated OAR are determined from a desired density map using the minimum MU constraint along with the weighted Voronoi stippling process, in accordance with an embodiment of the present invention. As discussed above, information associated with the PTV contour 720 (as seen from the field view) and OAR contour 721 within the PTV may be inputted into a treatment planning system (e.g., treatment planning system 350 of FIG. 3). The OAR contour 721 and the PTV contour 720 with their respective dose optimization constraints are first converted into a desired density map 730 for each field (e.g., the PTV field and the OAR field associated with the respective contours for each field). As seen in FIG. 7, a high density is assigned for the PTV field 720 and a low density is assigned for the OAR field 721 in order to protect the critical organs associated with the OAR field 721.

The density map 730 is subsequently used to produce a set of spot positions 740 for the PTV and OAR fields using the minimum MU constraints and the weighted Voronoi stippling process. In particular, the resultant set of spot positions 742 determined for the PTV field will be denser compared to the resultant set of spot positions 743 determined for the OAR field. Further, the resultant set of spot positions for both fields will satisfy the criteria for the minimum MU constraints. It should be noted that in the Voronoi Stippling process, the set of spot positions can be derived from an initial set of position with a specific delivery order (scanning pattern). The strength of this method is that it preserves the delivery order (the spot delivery sequencing) during the application of the Voronoi stippling process.

In one embodiment, instead of the Voronoi stippling process, a different process may also be used to determine spot positioning, e.g., the Lloyd's process. It should be noted that the Lloyd's process is a subcase of the weighted Voronoi stippling process where the input density is uniform.

Figure 8:
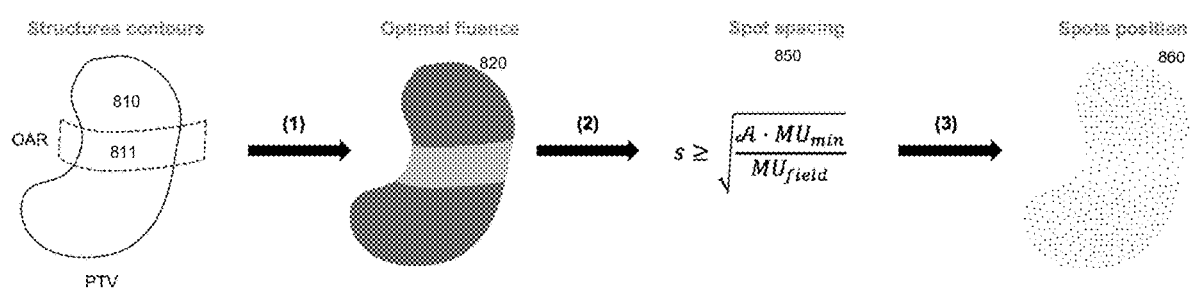
FIG. 8 illustrates an exemplary workflow diagram illustrating the manner in which field contours inputted into a treatment planning system are processed to determine spot position maps for respective fields, in accordance with an embodiment of the present invention.

FIG. 8 illustrates an exemplary workflow diagram illustrating the manner in which field contours input into a treatment planning system are processed to determine spot position maps for respective fields, in accordance with an embodiment of the present invention. As shown in FIG. 8, initially information associated with the PTV contour 810 (as seen from the field view) and OAR contour 811 within the PTV may be inputted into a treatment planning system (e.g., treatment planning system 350 of FIG. 3). An optimal fluence 820 is then determined by the treatment planning system (optimizer 350) of FIG. 3. Fluence is defined as the number of protons per unit of surface. Optimal fluence means that the fluence aims at satisfying the dosimetric objectives defined by the user, e.g., stipulating that the PTV receive 40 Gy. The optimal fluence also comprises a density map for each of the respective PTV and OAR fields. The spot spacing criteria 850 discussed in connection with equation 1.4 is then applied to make sure the spots in the final treatment plan adhere to a minimum distance between spots. Finally, the weighted Voronoi stippling process is applied to convert the density map into a final spot map 860, wherein each field is associated with a respective spot positioning, wherein the density of points is higher in fields associated with the PTV as compared to the OAR.

Figure 9:
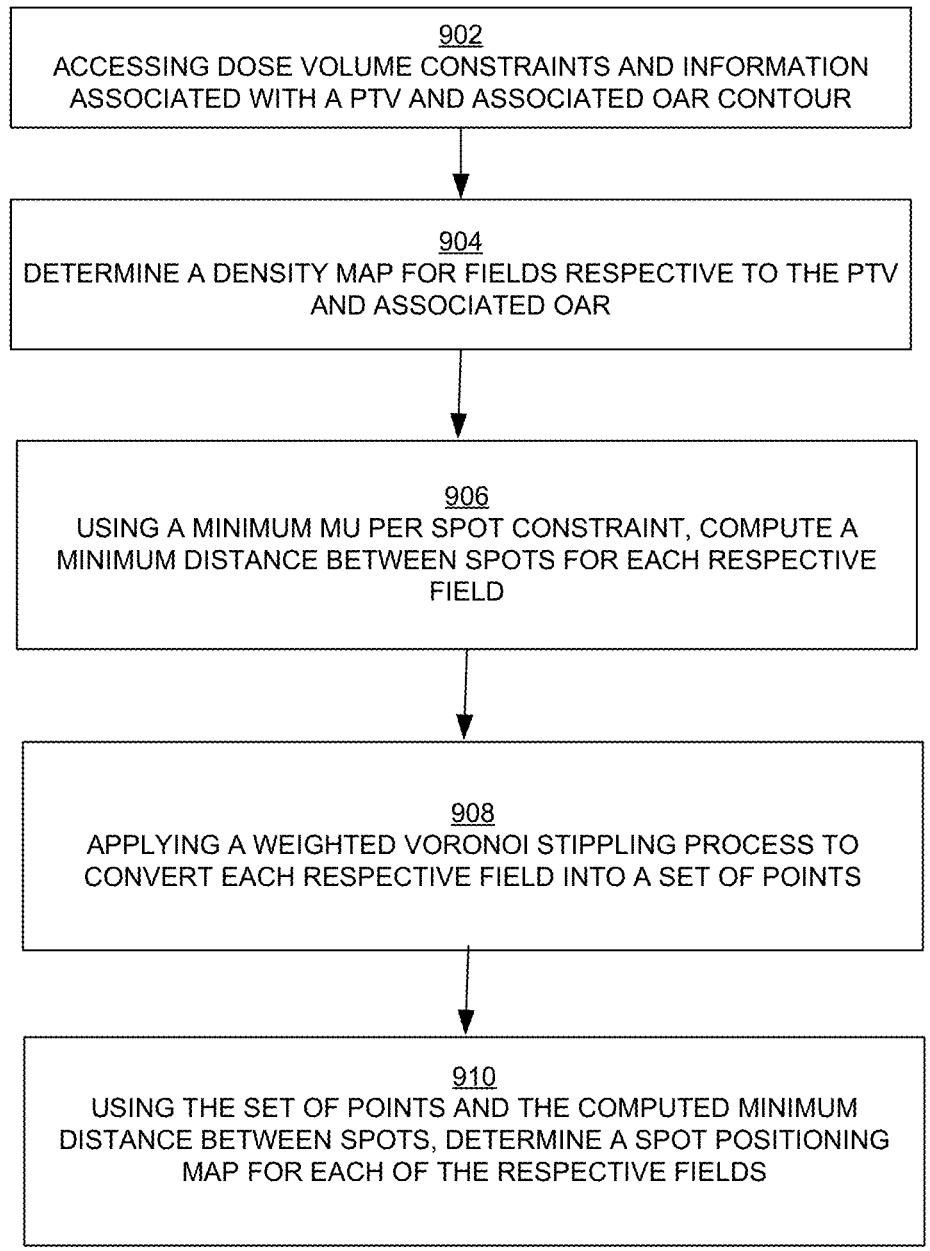
FIG. 9 is a flowchart depicting another exemplary process flow for determining spot positioning for one or more fields in a planning target volume (PTV), in accordance with an embodiment of the present invention.

FIG. 9$_{[PL1]}$ is a flowchart depicting another exemplary process flow 900 for determining spot positioning for one or more fields in a planning target volume (PTV), in accordance with an embodiment of the present invention.

At step 902, dose volume constraints and information associated with a PTV contour and associated OAR contour is accessed by a treatment planning system.

At step 904, a density map, given the dose volume constraints and the respective field contours, for each field is computed by the treatment planning system.

At step 906, minimum MU constraints per spot are used to determine to determine a minimum distance between spots for each of the respective fields.

At step 908, the weighted Voronoi stippling process is applied to the respective density maps to convert them into a set of points.

At step 910, the set of points and the computed minimum distance between spots for each of the respective fields is used to determine a spot map for the respective fields.

Embodiments of the present invention are able to predict the spot positions in a set of spot positions for a particular field (e.g., a PTV, an OAR, etc.) based on the minimum MU constraint and the optimization objectives associated with, for example, the PTV and OARs to derive a set of spot positions that fulfills both the minimum MU constraints and the optimization objectives. The goal is to determine a set of spot positions so that, during treatment, the treatment target will receive a homogenous dose (a uniform dose across the treatment target) and the delivered dose will conform more closely to the edges of the treatment target. Performing such an optimization is beyond the capability of a human and requires the use of a computing system. By allowing both the minimum weight and the optimization objectives (e.g., with respect to PTVs, OARs) to be combined, embodiments of the present invention advantageously allow treatment plans to be created that can overcome certain machine hardware constraints and provide for increased dose rates. Further the treatment plans may comprise a reduced number of spots in the plan, and also reduce delivery times for the plans.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of determining spot positioning for each field associated with a target volume (TV), said method comprising:
    accessing dose volume constraints and information associated with a target volume (TV) structure and an associated organs at risk (OAR) structure;
    determining a respective density map for each of the TV structure and the OAR structure;
    using a minimum number of Monitor Units (MU) per spot constraint, computing a respective minimum distance between spots for a portion of a field that overlaps with the TV structure and a portion of the field that overlaps with the OAR structure; and
    applying a rendering process to convert the density maps for each of the portions into a set of points; and
    using the set of points and the minimum distance between spots computed, determining a respective spot map for each of the portions.

2. The method of claim 1, further comprising:
    delivering a respective dose to the TV and OAR structures, wherein the spot map associated with the dose satisfies constraints associated with the minimum distance between spots computed.

3. The method of claim 1, wherein the rendering process comprises a weighted Voronoi stippling process.

4. The method of claim 1, wherein the rendering process is a Lloyd's process.

5. The method of claim 1, wherein the rendering process comprises a weighted Voronoi stippling process, and wherein the applying comprises deriving the set of points by preserving a spot delivery sequencing.

6. The method of claim 1, wherein the density map determined for the TV structure comprises a higher density compared to the density of the density map determined for the OAR structure.

7. The method of claim 1, wherein the determining the spot map comprises determining a position of each spot in each of the portions wherein no two spots are closer than the minimum distance between spots computed.

8. A computer system comprising a processor coupled to a bus and memory coupled to said bus wherein said memory is programmed with instructions that when executed cause said computer system to implement a method of determining spot positioning for each field associated with a target volume (TV), said method comprising:
    accessing dose volume constraints and information associated with a TV structure and an associated organ at risk (OAR) structure;

determining a respective density map for each of the TV structure and the OAR structure;

using a minimum number of protons per spot constraint, computing a respective minimum distance between spots for a portion of a field that overlaps with the TV structure and a portion of the field that overlaps with the OAR structure; and applying a rendering process to convert the density maps for each of the portions into a set of points; and using the set of points and the minimum distance between spots computed, determining a respective spot map for each of the portions.

9. The system of claim 8, wherein the method further comprises:

delivering a respective dose to the TV and OAR structures, wherein the spot map associated with the doses satisfies constraints associated with the minimum distance between spots computed.

10. The system of claim 8, wherein the rendering process is a weighted Voronoi stippling process.

11. The system of claim 8, wherein the rendering process is a Lloyd's process.

12. The system of claim 8 wherein the dose volume constraints comprise a minimum dose rate of 40 grays per seconds (Gy/s).

13. The system of claim 8, wherein the density map determined for the portion overlapping with the TV structure comprises a higher density compared to the density of the density map determined for the portion overlapping with the OAR structure.

14. The system of claim 8, wherein determining the spot map comprises determining a position of each spot in each of the portions such that no two spots are closer than the minimum distance between spots computed.

15. A computer implemented method of determining spot positioning for each field associated with a target volume (TV), said method comprising:

accessing dose volume constraints and information associated with contours associated with a TV structure and an associated organ at risk (OAR) structure;

using the dose volume constraints and the information associated with the contours, determining a respective density map for each of the structures;

using a minimum number of protons per spot constraint, computing a minimum distance between spots for a portion of a field that overlaps with the TV structure and a portion of the field that overlaps with the OAR structure; and applying a rendering process to convert the density maps for each of the portions into a set of points; and using the set of points and the minimum distance between spots computed, determining a spot map for each of the portions.

16. The method of claim 15, further comprising:

delivering a respective dose to the TV and OAR structures, wherein the spot map associated with the dose satisfies constraints associated with the minimum distance between spots computed.

17. The method of claim 15, wherein the rendering process comprises a weighted Voronoi stippling process.

18. The method of claim 15, wherein the rendering process comprises a Lloyd's process.

19. The method of claim 15, wherein the dose volume constraints comprise a minimum dose rate of 40 grays per seconds (Gy/s).

20. The method of claim 15, wherein the density map determined for the portion overlapping with the TV structure comprises a higher density compared to the portion overlapping with the OAR.

* * * * *